(12) United States Patent
Townsend

(10) Patent No.: US 10,234,203 B2
(45) Date of Patent: Mar. 19, 2019

(54) SEPARATOR FOR LUMBER STACKING

(71) Applicant: BREEZE DRIED INC., Tillsonburg (CA)

(72) Inventor: David Townsend, Tillsonburg (CA)

(73) Assignee: BREEZE DRIED INC., Tillsonburg, Ontario (CA)

( * ) Notice: Subject to any disclaimer, the term of this patent is extended or adjusted under 35 U.S.C. 154(b) by 338 days.

(21) Appl. No.: 15/095,461

(22) Filed: Apr. 11, 2016

(65) Prior Publication Data

US 2016/0298905 A1  Oct. 13, 2016

Related U.S. Application Data

(60) Provisional application No. 62/145,912, filed on Apr. 10, 2015.

(51) Int. Cl.
*F26B 7/00* (2006.01)
*F26B 25/18* (2006.01)
*B27M 1/02* (2006.01)
*B65G 1/14* (2006.01)
*B65G 57/00* (2006.01)
*B27M 3/08* (2006.01)

(52) U.S. Cl.
CPC ............ *F26B 25/185* (2013.01); *B27M 1/02* (2013.01); *B27M 3/08* (2013.01); *B65G 1/14* (2013.01); *B65G 57/005* (2013.01); *B65G 2201/0282* (2013.01)

(58) Field of Classification Search
CPC .......... F26B 25/185; B27M 3/08; B27M 1/02; B65G 1/14; B65G 57/005; B65G 2201/0282
USPC ................. 34/518, 442, 103, 107, 218, 239; 211/49.1, 59.4, 60.1, 85.12; 108/55.3; 247/346.02, 346.4
See application file for complete search history.

(56) References Cited

U.S. PATENT DOCUMENTS

2001/0000875 A1\* 5/2001 Townsend ................ B65G 1/14
144/371
2016/0290717 A1\* 10/2016 Wagner .................... F26B 25/00

\* cited by examiner

*Primary Examiner* — John P McCormack

(57) ABSTRACT

An improved separator for separating lumber in a stack of a plurality of layers has a primary profile for minimizing the contact area and maximizing airflow between the separator and the adjacent boards and a secondary profile for improving frictional resistance between the separator and the adjacent boards. The primary profile comprises a plurality of grooves and a plurality of ridges formed therebetween. The secondary profile comprises a plurality of depressions on the ridges.

11 Claims, 2 Drawing Sheets

SEPARATOR FOR LUMBER STACKING

BACKGROUND

A separator, sometimes referred to as a "lath", "stick", "sticker", or "crosser", is used in the lumber industry to separate lumber in a stack, sometimes referred to as a "bundle" or "lift". In the lumber industry, timber is cut into boards or lumber and stacked in a shed or kiln to dry before shipping. The boards in a stack of lumber are spaced apart by separators usually placed transversely to the length of the boards. A stack of lumber is made of a number of boards placed in spaced apart and parallel layers.

Stacks of lumber may be placed on top of one another using spacer blocks between each stack. The spacer blocks are normally larger than a separator, but both are normally made from the same material, for example, a low grade lumber such as spruce. Spacer blocks separate the bottom layer of lumber from the ground or the stack below and provide sufficient space to permit access beneath the bottom layer, for example, with the forks of a lift truck for lifting and transporting the stack or lumber. A separator is typically about 1" thick, while a spacer block is typically about 4" thick. As used herein, the term "separator" includes spacer blocks.

One problem with the use of separators is the imprint or stain, sometimes referred to as a "shadow" or "sticker stain", which can be left on the boards in a stack where they have been in contact with the separators. This staining may render the lumber unmerchantable for certain end uses.

Various attempts have been made to resolve the stain problem in the lumber industry, as for example, modifying the surface of the separator which comes into contact with the boards in a stack to minimize the contact area or maximize airflow between the separators and the boards. With the use of separators the stability of a stack of lumber is a concern when it is being moved, for example, on the forks of a lift truck in a lumber yard on uneven terrain. Relative motion between the layers in a stack can result in movement of the stack or spillage during transport, whereby the stack loses its structural integrity and presents a safety risk to workers handling stacks of lumber.

SUMMARY OF THE INVENTION

An improved separator, according to the present invention, has a primary profile for minimizing the contact area and maximizing airflow between the separator and the adjacent boards and a secondary profile for improving frictional resistance between the separator and adjacent boards. The primary profile is made of a plurality of grooves and ridges extending transversely to the length of the separator. The secondary profile is made of a plurality of depressions on the peaks of the ridges extending substantially transversely to the length of the ridges.

According to one embodiment, an improved separator for separating lumber in a stack of a plurality of layers, has a length, a height, a width, and opposing sides. The length spans across one or more pieces of lumber in a layer and the height is sufficient to separate adjacent layers to permit air circulation therebetween. A plurality of grooves extend transversely to the length of the separator and a plurality of ridges are formed between successive pairs of grooves. The ridges have peaks to reduce contact of the separator with one or more pieces of lumber in a layer and have a height sufficient to permit air circulation within the grooves. A plurality of depressions on the peaks of the ridges extend transversely to the length of the ridges.

BRIEF DESCRIPTION OF THE DRAWINGS

In order that the invention may be more clearly understood, a preferred embodiment thereof will now be described in detail by way of example, with reference to the accompanying drawings, in which.

DESCRIPTION OF THE INVENTION

An improved separator, according to the present invention, has a primary profile and a secondary profile. The primary profile reduces the contact area between the separator and the adjacent boards in a stack of lumber. The secondary profile increases the frictional resistance between the separator and the adjacent boards in a stack of lumber, above and below.

The separator 1 has a length that spans across one or more boards, or pieces of lumber, and a height to separate the layers of a stack of lumber. The height is sufficient to provide air circulation between the layers. Preferably, a separator 1 has a height of about 1", including the height of the ridges 3, or 4" for spacer blocks. Lumber is commonly stacked using separators 1 for the purpose of air drying the boards or to maintain the boards in a dry condition.

Figure 1:
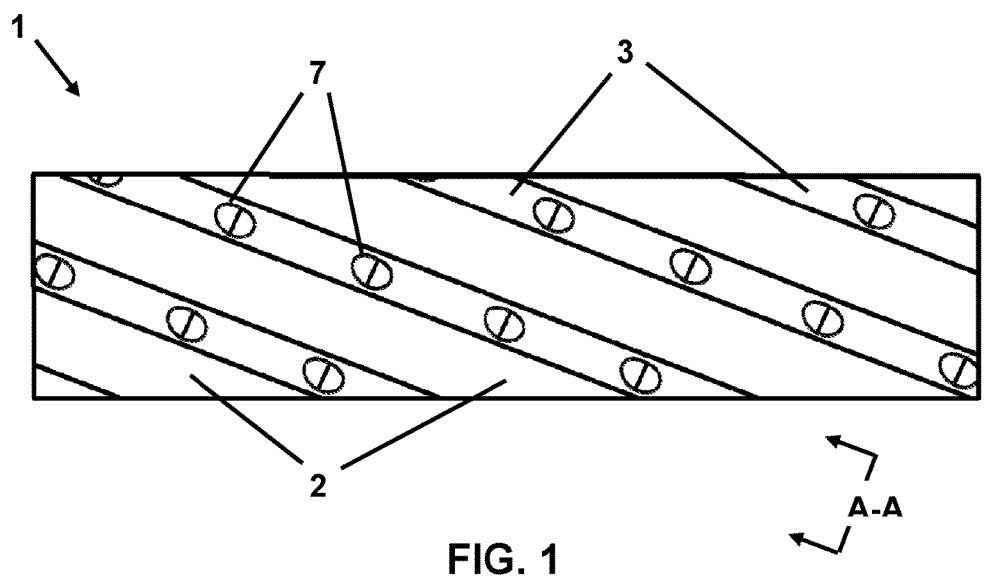
FIG. 1 is a top view on one side of a separator, according to the present invention.
Figure 2:
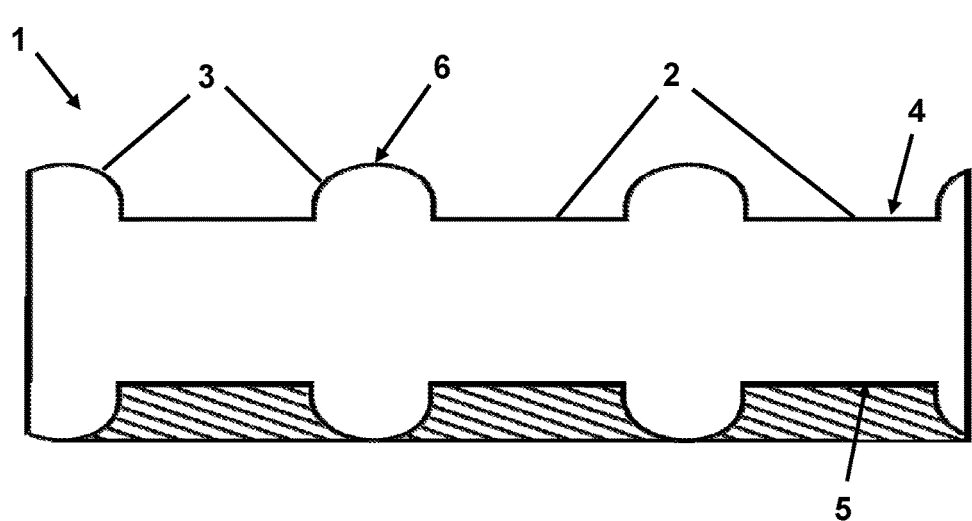
FIG. 2 is a side view of the separator, viewed along the lines A-A in FIG. 1, showing the primary profile.
Figure 3:
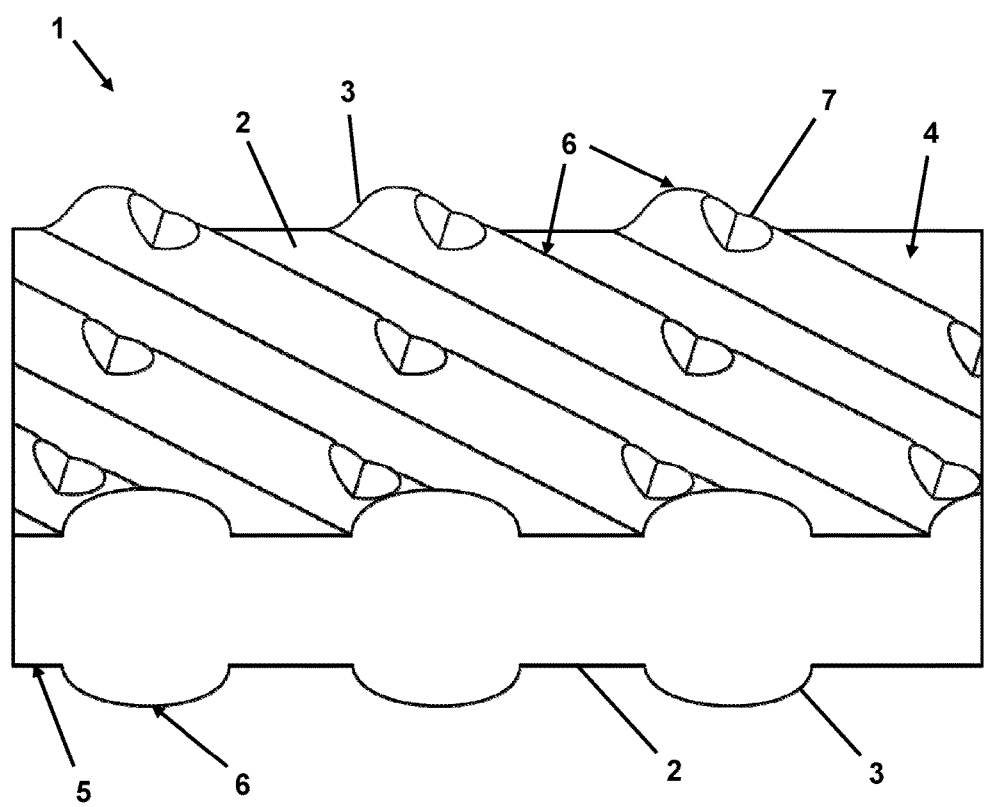
FIG. 3 is a perspective view of the separator.

As shown in FIGS. 1 and 2, the primary profile of the separator 1 comprises a plurality of grooves 2 separated by a plurality of ridges 3 extending transversely to the length of the separator 1. The primary profile is provided on both sides of the separator 1, preferably, the top side 4 and the bottom side 5 of the separator 1. The ridges 3 may extend along the top side 4 and the bottom side 5 at any angle to the length of the separator 1. Preferably, the ridges 3 on the top side 4 and the ridges 3 on the bottom side 5 are arrange transversely to one another on opposing sides of the separator 1. In order to provide the desired level of air circulation, the ridges preferably cross the length of the separator 1 at an angle between 20° and 90°. Preferably, the ridges 3 on each side are parallel to one another and evenly spaced apart by grooves 2. As shown in FIGS. 2 and 3, the ridges 3 are smoothly rounded, with peaks 6 that contact the adjacent boards.

Alternatively, other primary profiles may be used to minimize the contact area and increase air circulation between the separator 1 and the boards, so long as the primary profile has ridges 3, or a similar protruding structure, that supports the boards, separated by grooves 2 or channels, apertures, or other similar structures, that permit air circulation between the boards and the separator 1. According to the present invention, a secondary profile is then provided on top of the primary profile to increase the frictional resistance between the separator 1 and the adjacent boards in a stack of lumber.

As shown in FIG. 3, the secondary profile of the separator 1 comprises a plurality of depressions 7 on the peaks 6 of the ridges 3. The depressions 7 extend transversely to the length of the ridges 3 at an angle between 20° and 90°. The size of the depressions 7 is selected to be as small as possible while still allowing for an increase in frictional resistance, but not so large as to cause a dent in the lumber as a result of a decrease in surface area of the separator 1 making contact with the board.

The shape of the depressions 7 is preferably rounded or wedge-shaped. The slope or angle at which the depression meets the peak 6 of the ridge 3 is steep enough to increase the frictional resistance between the separator 1 and the adjacent board, but shallow enough not to scratch or mark the surface of the board. The spacing of the depressions 7 is selected to provide a maximum amount of frictional resistance while not compromising the integrity of the separator 1 and allowing for even weight distribution of the lumber over the ridges 3.

The depth of the depressions 7 is selected to be deep enough to create a void between the peak 6 of the ridge 3 and the adjacent board, but not so deep as to compromise the structural integrity of the separator 1. When a plurality of layers are stacked on top of one another, the weight of the lumber causes the boards to deform slightly, in situ, into the void to thereby increase the frictional resistance between the boards and the separator 1.

The tendency of the board to deform into the void is related to the type of wood in the stack. Compressibility describes the tendency of the surface of the board to deform into the void. The deformation of the board causes the surface of the board to engage with the edges of the depression 7 and the peak 6 of the ridge 3, which results in an increased frictional resistance to relative motion between the separator 1 and the board, in the plane of the surface of the board.

According to another aspect of the present invention, a method is provided for producing a secondary profile on lumber stack separators. The secondary profile is created by removing a small portion of the surface of the primary profile of the separator 1. This is done by applying pressure with a moulding roller which indents the separator 1 at a defined interval. The moulding roller makes contact and applies pressure to the peaks 6 of the ridges 3, thereby creating the depressions 7. This creates a void which the lumber, as a slightly deformable and elastic material then fills, as described above. By creating the depressions through applied pressure from the moulding roller, the separator 1 is modified enough to provide a secondary profile, but not so significantly as to damage or compromise the structural integrity of the separator 1.

The foregoing description, together with the accompanying figures, have set out detail of the structure and function of the present invention, however, the disclosure is to be understood as illustrative and changes may be made without departing from the scope of the invention set out in the following claims.

What is claimed is:

1. An improved separator for separating lumber in a stack of a plurality of layers, the separator comprising a length, a height, a width, opposing sides, a plurality of grooves extending transversely to the length, and a plurality of ridges formed between the grooves, wherein each ridge has a length, a height, a peak, and a plurality of depressions formed on the peak extending transversely to the length of the ridge.

2. The improved separator of claim 1, wherein the ridges and grooves are formed on both sides.

3. The improved separator of claim 2, wherein the ridges are parallel to one another and evenly spaced apart.

4. The improved separator of claim 3, wherein the ridges on one side are arranged transversely to the ridges on the opposing side.

5. The improved separator of claim 4, wherein the ridges cross the length of the separator at an angle between 20° and 90°.

6. The improved separator of claim 5, wherein the ridges are smoothly rounded.

7. The improved separator of claim 6, wherein the depressions are wedge-shaped.

8. The improved separator of claim 6, wherein the depressions are rounded.

9. The improved separator of claim 7, wherein the depressions extend transversely to the length of the ridges at an angle between 20° and 90°.

10. An improved separator for separating lumber in a stack of a plurality of layers, the separator comprising a length, a height, a width, a primary profile, and a secondary profile, wherein:
    the primary profile consists of a plurality of grooves extending transversely to the length and a plurality of ridges formed between the grooves, wherein each ridge has a length, a height, a peak, and
    the secondary profile consists of a plurality of depressions formed on the peaks and extending transversely to the length of the ridges.

11. A method for producing a secondary profile on a separator, comprising the steps of:
    providing a separator comprising a length, a height, a width, and a primary profile, consisting of a plurality of grooves extending transversely to the length and a plurality of ridges formed between the grooves, wherein each ridge has a length, a height, and a peak, and
    pressing a moulding roller over the peaks of the ridges to thereby create a plurality of depressions thereon extending transversely to the length of the ridges.

* * * * *